(12) United States Patent
Arunachalam et al.

(10) Patent No.: US 11,228,355 B2
(45) Date of Patent: Jan. 18, 2022

(54) METHODS OF ENERGY OPTIMIZATION FOR MULTI-ANTENNA SYSTEMS

(71) Applicant: Telefonaktiebolaget LM Ericsson (publ), Stockholm (SE)

(72) Inventors: Jagadeesh Arunachalam, Malmö (SE); Jens Jansson, Lund (SE); Joakim Persson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/954,708

(22) PCT Filed: Dec. 20, 2017

(86) PCT No.: PCT/SE2017/051308
§ 371 (c)(1),
(2) Date: Jun. 17, 2020

(87) PCT Pub. No.: WO2019/125242
PCT Pub. Date: Jun. 27, 2019

(65) Prior Publication Data
US 2021/0091833 A1    Mar. 25, 2021

(51) Int. Cl.
*H04B 7/06* (2006.01)
*H04B 7/0426* (2017.01)
*H04W 52/02* (2009.01)

(52) U.S. Cl.
CPC ......... *H04B 7/0617* (2013.01); *H04B 7/0426* (2013.01); *H04W 52/028* (2013.01); *H04W 52/0245* (2013.01)

(58) Field of Classification Search
CPC ......... H04W 52/0245; H04W 52/0229; H04W 52/0216; H04W 52/0219; H04W 52/028; H04W 24/10; H04W 74/006; H04W 52/0254; H04W 52/0274; H04W 52/146; H04W 16/28; H04W 88/02; H04B 7/0617; H04B 7/0426; Y02D 30/70
See application file for complete search history.

(56) References Cited

U.S. PATENT DOCUMENTS 9,014,095 B2    4/2015  Suo et al.
9,270,022 B2    2/2016  Zhang et al.
(Continued)

FOREIGN PATENT DOCUMENTS

WO    2017198293 A1    11/2017

OTHER PUBLICATIONS

PCT International Search Report and Written Opinion dated Oct. 30, 2018 for International Application PCT/SE2017/051308, 12 pages.
(Continued)

*Primary Examiner* — Vineeta S Panwalkar
(74) *Attorney, Agent, or Firm* — Sage Patent Group

(57) ABSTRACT

The solution presented herein improves the power consumption of an antenna array, such as used in beamforming systems, based on the antenna weights of the one or more antenna elements of the subarrays of the antenna array. To that end, a transmitter node comprising the antenna array determines whether the antenna weights of each subarray satisfy a threshold condition. If the weights satisfy the threshold condition, the transmitter node disables the corresponding power amplifier.

20 Claims, 10 Drawing Sheets

(56) References Cited

U.S. PATENT DOCUMENTS

| | | | |
|---|---|---|---|
| 10,211,904 B2* | 2/2019 | Hessler | H04W 52/146 |
| 2012/0165063 A1 | 6/2012 | Scalia et al. | |
| 2012/0315948 A1 | 12/2012 | Frenger et al. | |
| 2014/0055302 A1* | 2/2014 | Jia | H04B 7/0695 |
| | | | 342/372 |
| 2015/0208345 A1* | 7/2015 | Weissman | H04W 52/0209 |
| | | | 455/574 |
| 2016/0268988 A1* | 9/2016 | Jeon | H03F 3/24 |
| 2017/0176507 A1* | 6/2017 | O'Keeffe | H04B 1/0483 |
| 2018/0198204 A1 | 7/2018 | Kovacic | |
| 2021/0067209 A1* | 3/2021 | Gopal | H04B 7/0602 |

OTHER PUBLICATIONS

Oleg Iupikov, "Effects of the Number of Active Receiver Channels on the Sensitivity of a Reflector Antenna System with a Multi-Beam Wideband Phased Array Feed", Sevastopol National Technical University, Ukraine, 12 pages.

Carlo Bencivenni et al., "A Simple Method for Optimal Antenna Array Thinning using a Broadside MaxGain Beamformer", 7th European Conference on Antennas and Propagation, EuCAP 2013, Gothenburg, Sweden, Apr. 8-12, 2013, pp. 1799-1802.

* cited by examiner

METHODS OF ENERGY OPTIMIZATION FOR MULTI-ANTENNA SYSTEMS

CROSS-REFERENCE TO RELATED APPLICATIONS

This application is a 35 U.S.C. § 371 national stage application for International Application No. PCT/SE2017/051308, entitled "METHODS OF ENERGY OPTIMIZATION FOR MULTI-ANTENNA SYSTEMS", filed on Dec. 20, 2017, the disclosures and contents of which are hereby incorporated by reference in their entireties.

TECHNICAL FIELD

The solution presented herein relates generally to wireless communication systems, and more particularly to the configuration of antennas having multiple antenna elements for energy optimization.

BACKGROUND

Wireless communication systems, e.g., Multiple Input Multiple Output (MIMO) systems, Orthogonal Frequency Division Multiplexing (OFDM) systems, etc., increasingly use larger antenna arrays for signal transmission to more precisely direct radiated energy towards a target receiver. Such beamforming improves the strength of the signals received by the target receiver, and thus improves signal quality, network capacity, performance, throughput, etc.

While antenna arrays are designed to improve performance and beamforming precision, they often do so at the expense of high power consumption due to the large number of power amplifiers (PAs) required to implement such antennas. Thus, there is a need for improved beamforming systems with reduced power consumption.

SUMMARY

The solution presented herein improves the power consumption of an antenna array, such as used in beamforming systems, based on the antenna weights of the array's antenna elements. More particularly, the solution presented herein considers whether the antenna weights satisfy a threshold condition in determining whether to disable a corresponding power amplifier. In so doing, the solution presented herein reduces power consumption of the antenna array while preserving the performance of the antenna array.

One exemplary embodiment comprises a method of controlling power consumption of an antenna array in a transmitting node configured to communicate with a receiving node via a beam having a beam shape and a beam direction configured by the transmitting node. The antenna array comprises a plurality of subarrays, each subarray comprising one or more antenna elements, and each antenna element comprising at least one antenna weight for each of a plurality of subcarrier frequencies. The method comprises determining, for each subarray, whether the corresponding plurality of antenna weights satisfy a threshold condition. The method further comprises, for each subarray, disabling a power amplifier for the subarray when the corresponding plurality of antenna weights satisfy the threshold condition.

One exemplary embodiment comprises a transmitting node configured to communicate with a receiving node via a beam having a beam shape and a beam direction configured by the transmitting node. The transmitting node comprises an antenna array and one or more processor circuits. The antenna array comprises a plurality of subarrays and a plurality of power amplifiers. Each subarray comprises one or more antenna elements, where each antenna element comprises at least one antenna weight for each of a plurality of subcarrier frequencies. Each power amplifier is operatively connected to a corresponding one of the plurality of subarrays. The one or more processor circuits are configured to, for each subarray, determine whether the corresponding plurality of antenna weights satisfy a threshold condition. The one or more processor circuits are further configured to, for each subarray disable the power amplifier operatively connected to the subarray when the corresponding plurality of antenna weights satisfy the threshold condition.

One exemplary embodiment comprises a transmitting node configured to communicate with a receiving node via a beam having a beam shape and a beam direction configured by the transmitting node. The transmitting node comprises an antenna array and one or more processor modules. The antenna array comprises a plurality of subarrays and a plurality of power amplifiers. Each subarray comprises one or more antenna elements, where each antenna element comprises at least one antenna weight for each of a plurality of subcarrier frequencies. Each power amplifier is operatively connected to a corresponding one of the plurality of subarrays. The one or more processor modules are configured to, for each subarray, determine whether the corresponding plurality of antenna weights satisfy a threshold condition. The one or more processor modules are further configured to, for each subarray disable the power amplifier operatively connected to the subarray when the corresponding plurality of antenna weights satisfy the threshold condition.

One exemplary embodiment comprises a computer program product for controlling an antenna array in a transmitting node configured to communicate with a receiving node via a beam having beam shape and a beam direction configured by the transmitting node. The antenna array comprises a plurality of subarrays, each subarray comprising one or more antenna elements, and each antenna element comprising at least one antenna weight for each of a plurality of subcarrier frequencies. The computer program product comprises software instructions which, when run on at least one processor circuit in the transmitting node, causes the transmitting node to determine, for each subarray, whether the corresponding plurality of antenna weights satisfy a threshold condition. The software instructions, when run on the at least one processor circuit in the transmitting node, further causes the transmitting node to, for each subarray, disable a power amplifier for the subarray when the corresponding plurality of antenna weights satisfy the threshold condition.

DETAILED DESCRIPTION

In beamforming, the network node performs channel estimation and calculates beam forming weights for the antenna elements of an antenna array. Two common procedures for such beamforming are, e.g., Sounding Reference Signal (SRS) based beamforming and Demodulation Reference Signal (DMRS) based beamforming. In both types of beamforming, the network determines the channel state by measuring the reference signals. For example, the weights may be derived from a hypothesis so that the signals from different antenna elements are constructively combined at the wireless communication device. Exemplary beam forming control calculates one beamforming weight per antenna element per SubCarrier Group (SCG) for each device scheduled in the Transmission Time Interval (TTI), where a SCG is a group of contiguous Resource Elements (REs). As discussed above, current beamforming systems are designed to maximize throughput and/or coverage, but do so at the expense of power consumption.

Conventional solutions typically rely on one of two approaches for reducing the power consumption in such beamforming systems. For example, conventional antenna elements may be muted during empty symbol periods. While useful for legacy systems, implementing this conventional power savings solution in some future systems, e.g., 5G systems, is undesirably complex.

Another exemplary conventional solution utilizes zero insertion, i.e., when antenna elements are overheated. Implementation of this solution involves applying zero weights for overheated antenna elements. However, the power savings for this solution is not significant because the transmitter and all associated components are still active.

The solution presented herein considers the trade-off between the desired cell coverage/end user performance and power consumption to take advantage of the fact that muting a single antenna element, or a few antenna elements, that have the lowest amplitude, for example, should not significantly change the beam property in most cases. To that end, the solution presented herein disables the antenna element(s) (by, e.g., disabling the corresponding power amplifier(s)) when the antenna weights for such antenna elements satisfy a threshold condition. This solution therefore enables significant power savings without overly impacting the overall beam properties. As used herein, references to antenna weights relative to a threshold condition refer to the amplitude of the antenna weights relative to the threshold condition unless otherwise specified.

Figure 1:
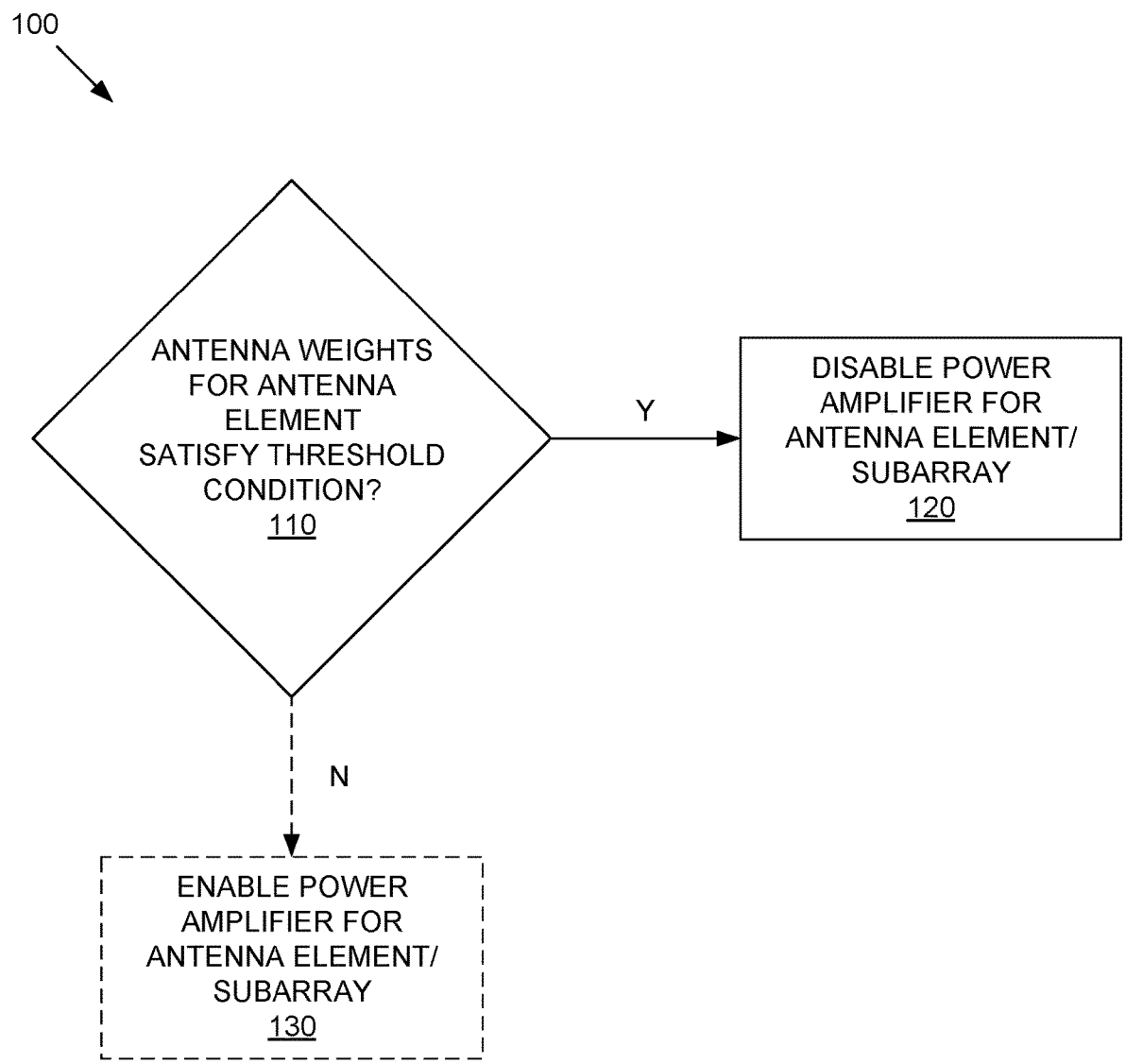
FIG. 1 shows a power consumption control method according to one exemplary embodiment.
Figure 2:
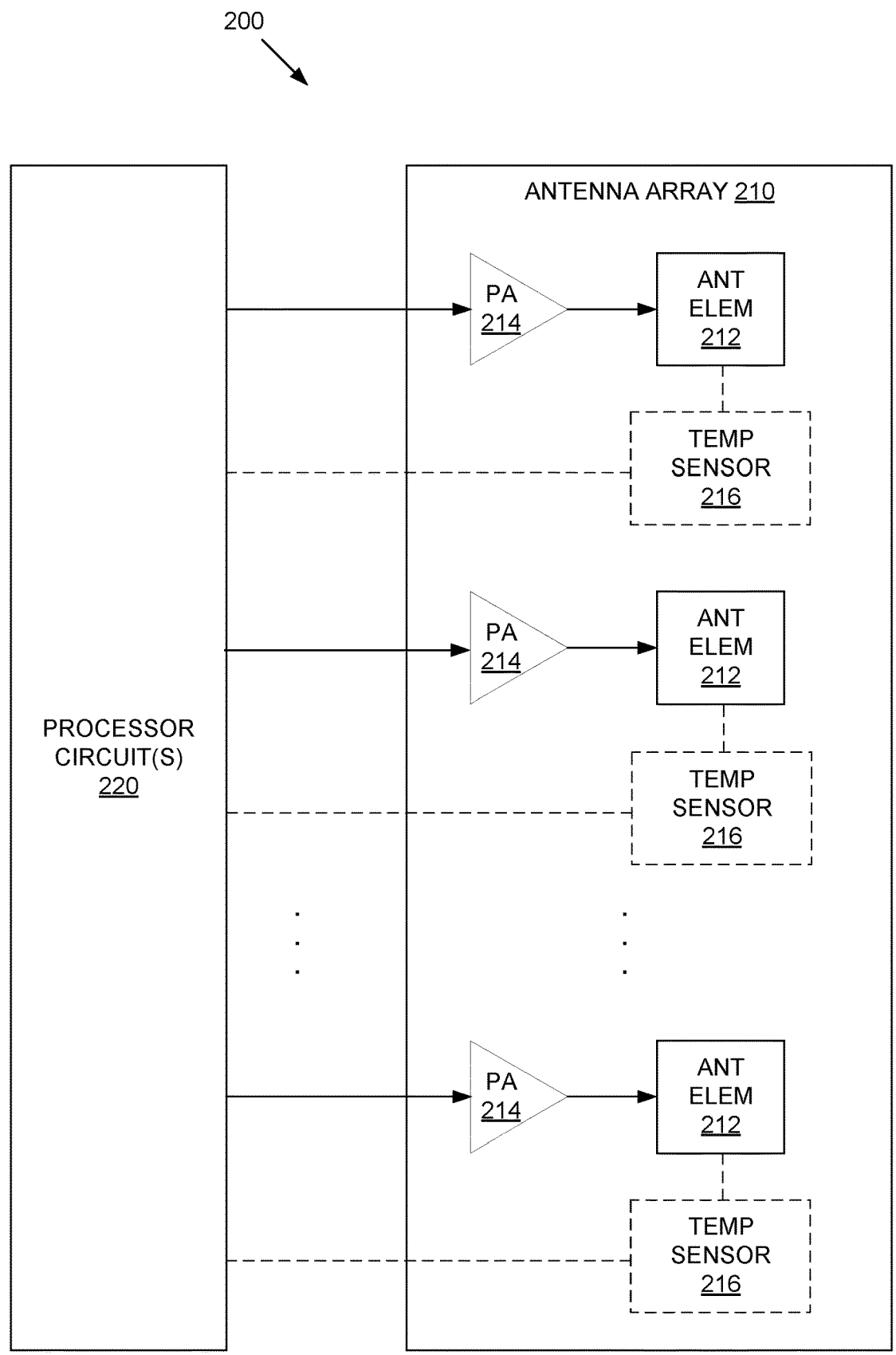
FIG. 2 shows a block diagram of a transmitting node according to one exemplary embodiment.
Figure 3:
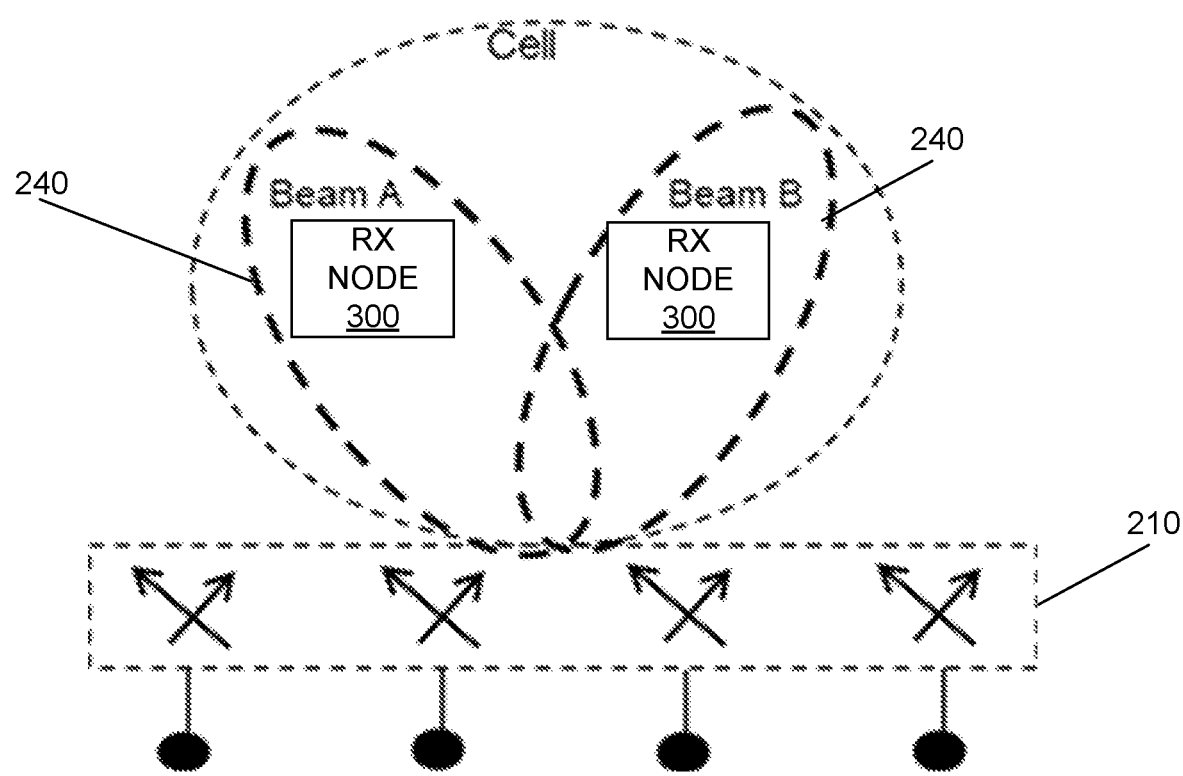
FIG. 3 shows a block diagram of a wireless network comprising the transmitting node of the solution presented herein transmitting to multiple receiving nodes.

FIGS. 1 and 2 show a method 100 of controlling the power consumption of an antenna array in a transmitting node 200 and the corresponding transmitting node 200, respectively, according to exemplary embodiments of the solution presented herein. Transmitting node 200 transmits wireless signals to one or more receiving nodes 300 via a beam 240. The beam 240 has a beam shape and direction configured by the transmitting node 200 to more precisely direct the wireless signal to a particular receiving node 300, as shown in FIG. 3, where the beam direction generally refers to the direction of the main lobe of the beam 240, while the beam shape generally refers to the width of the beam 240.

Figure 4A:
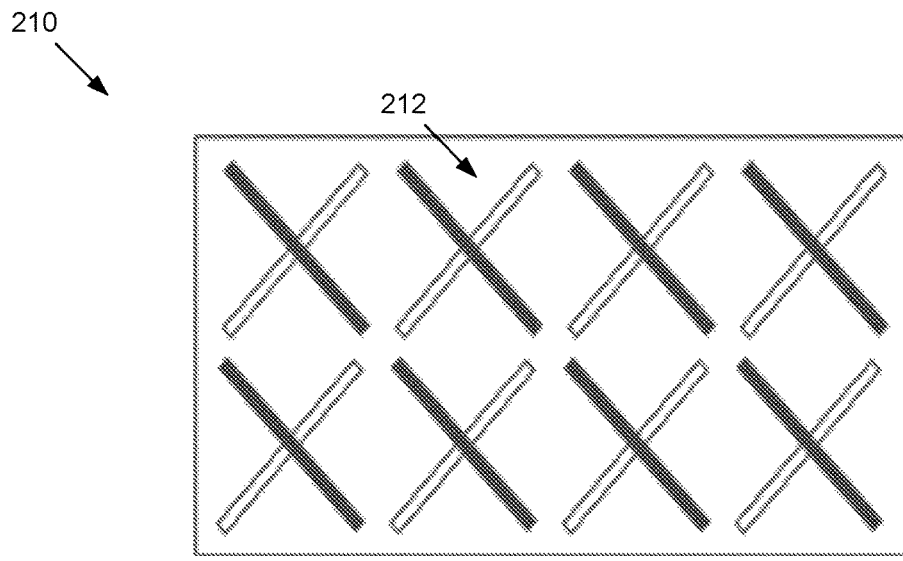
FIG. 4A shows an exemplary 2×4 antenna array comprising cross-polarized antenna elements.
Figure 4B:
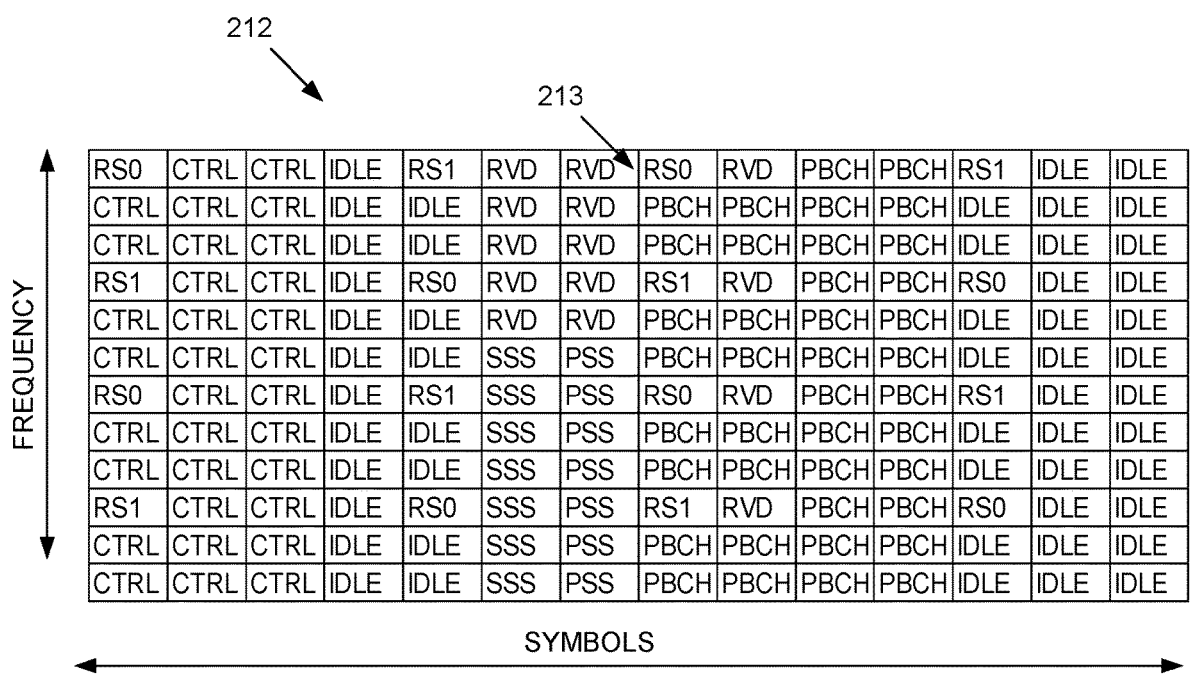
FIG. 4B shows an exemplary LTE resource grid representing exemplary data carried on one antenna element.

Transmitting node 200 comprises an antenna array 210 and one or more processor circuits 220. The antenna array 210, an example of which is shown in FIG. 4A, comprises a plurality of antenna elements 212 and a power amplifier (PA) 214 operatively connected to each antenna element 212. Each antenna element 212 in array 210 corresponds to a particular subcarrier group, where each antenna element 212 is assigned at least one antenna weight per subcarrier group. Further, as shown in FIG. 4B, each antenna element 212 comprises a plurality of symbols per frequency (e.g., per subcarrier group), where each box in FIG. 4B represents one resource element 213. For example, in Long Term Evolution (LTE) systems, 14 symbols spanning 1 ms for each antenna element 212, as shown in FIG. 4B. In some embodiments, each resource element 213 may be assigned its own antenna weight. In other embodiments, multiple resource elements 213 may be assigned a common antenna weight. Thus, each antenna element 212 may comprise one or more antenna weights.

According to one exemplary method 100, the processor circuit(s) 220 determine, for each antenna element 212, whether the corresponding plurality of antenna weights satisfy a threshold condition (block 110). When the corresponding plurality of antenna weights 212 satisfy the threshold condition, the processor circuit(s) 220 disable a power amplifier 214 for the antenna element 210 (block 120). While not required, the solution presented herein may optionally include enabling the power amplifier 214 when the corresponding plurality of antenna weights does not satisfy the threshold condition (block 130).

Figure 5:
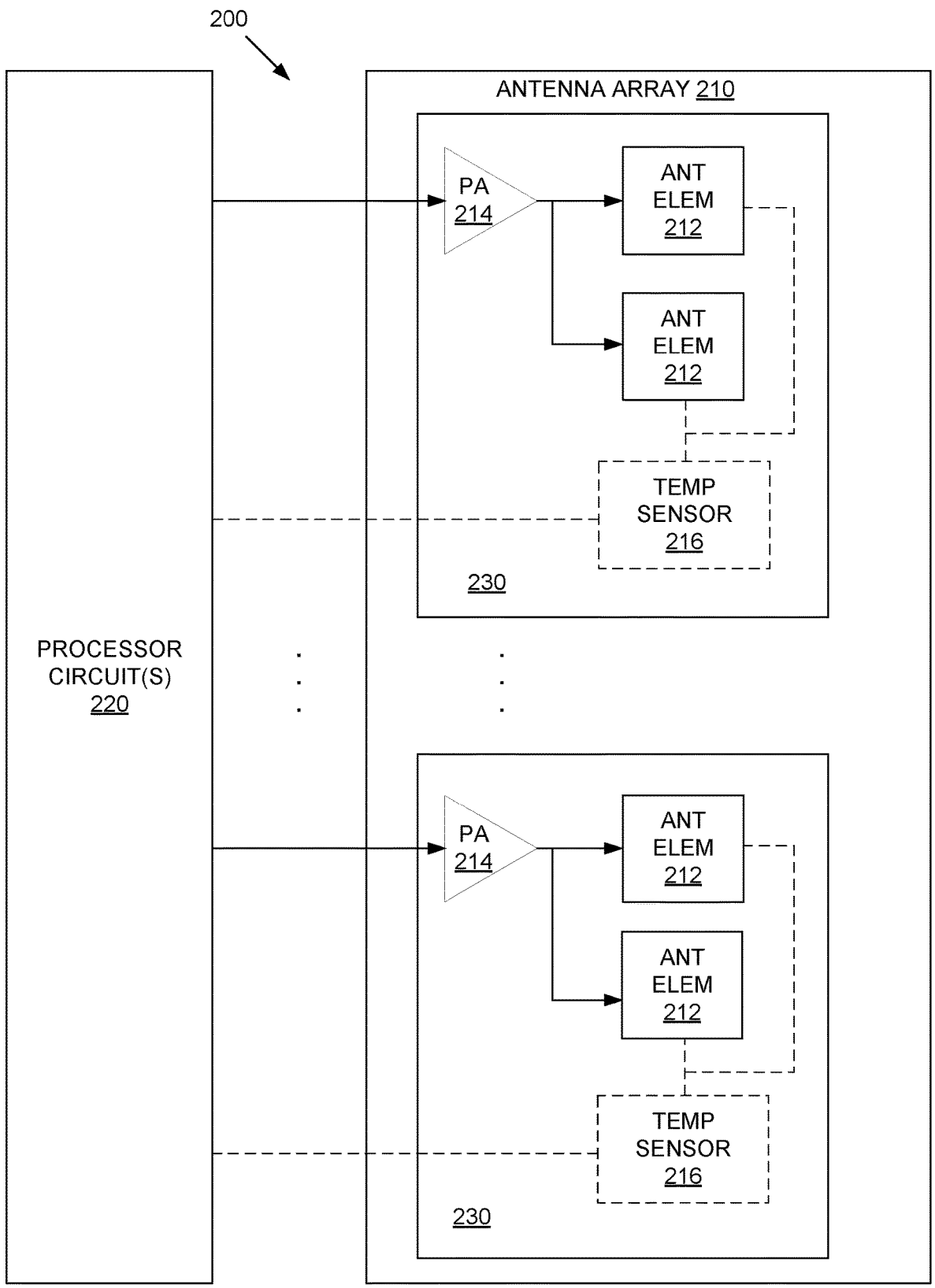
FIG. 5 shows a block diagram of a transmitting node according to another exemplary embodiment.

The solution of FIG. 2 assumes each antenna element 212 has its own power amplifier 214. In some exemplary solutions, however, multiple antenna elements 212 may form a subarray 230, where each subarray 230 operatively connects to a power amplifier 214, as shown in FIG. 5. In this embodiment, the processor circuit(s) 220 disable the power amplifier 214 for the subarray 230 when the antenna weights of the subarray 230 satisfy the threshold condition. The following describes details for the solution presented herein in terms of a subarray 230 comprising one or more antenna elements 212. Thus, all of the details presented herein apply equally well to the solutions of FIGS. 2 and 5.

In some exemplary embodiments, transmitting node 200 may include one or more optional temperature sensors 216 configured to monitor the temperature of the antenna array 210. For example, the transmitting node 200 may comprise one temperature sensor 216 for each antenna element 212, as shown in FIG. 2. In another example, the transmitting node 200 may comprise one temperature sensor 216 for each subarray 230, as shown in FIG. 5. In yet another example, the transmitting node 200 may comprise one temperature sensor 216 for all antenna elements 212 or for each of multiple subarrays 230. The processor circuit(s) 220 may use the output of the temperature sensor(s) 216 for various optional aspects of the solution presented herein, as discussed further below. As shown in FIGS. 2 and 5, the temperature sensor(s) 216 may be part of the antenna array 210. Alternatively, the temperature sensor(s) 216 may comprise a component within the transmitting node 200 separate from, but operatively connected to, the antenna array 210.

Figure 6:
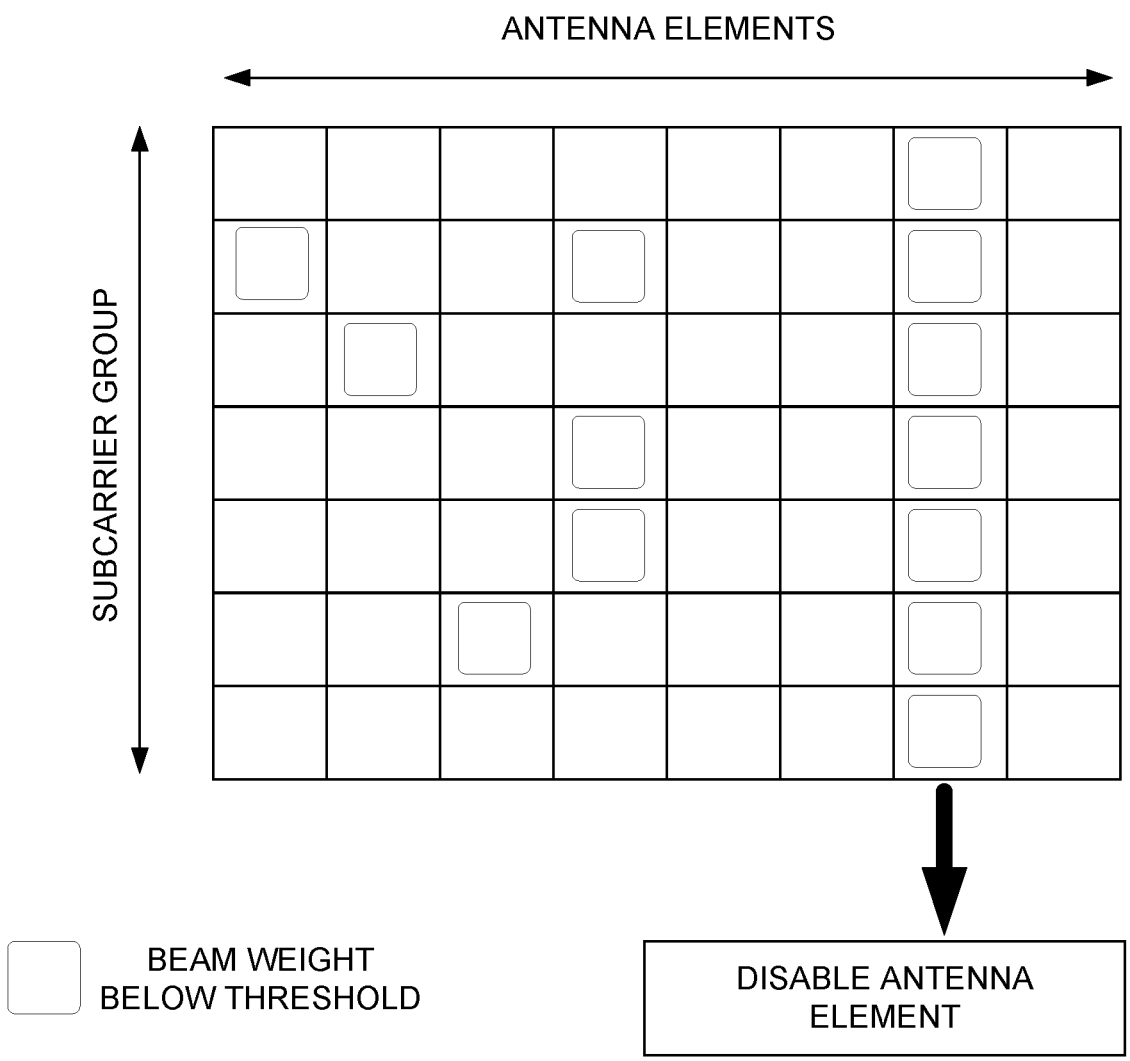
FIG. 6 shows an example for disabling one or more antenna element using weight thresholds according to one exemplary embodiment.
Figure 7:
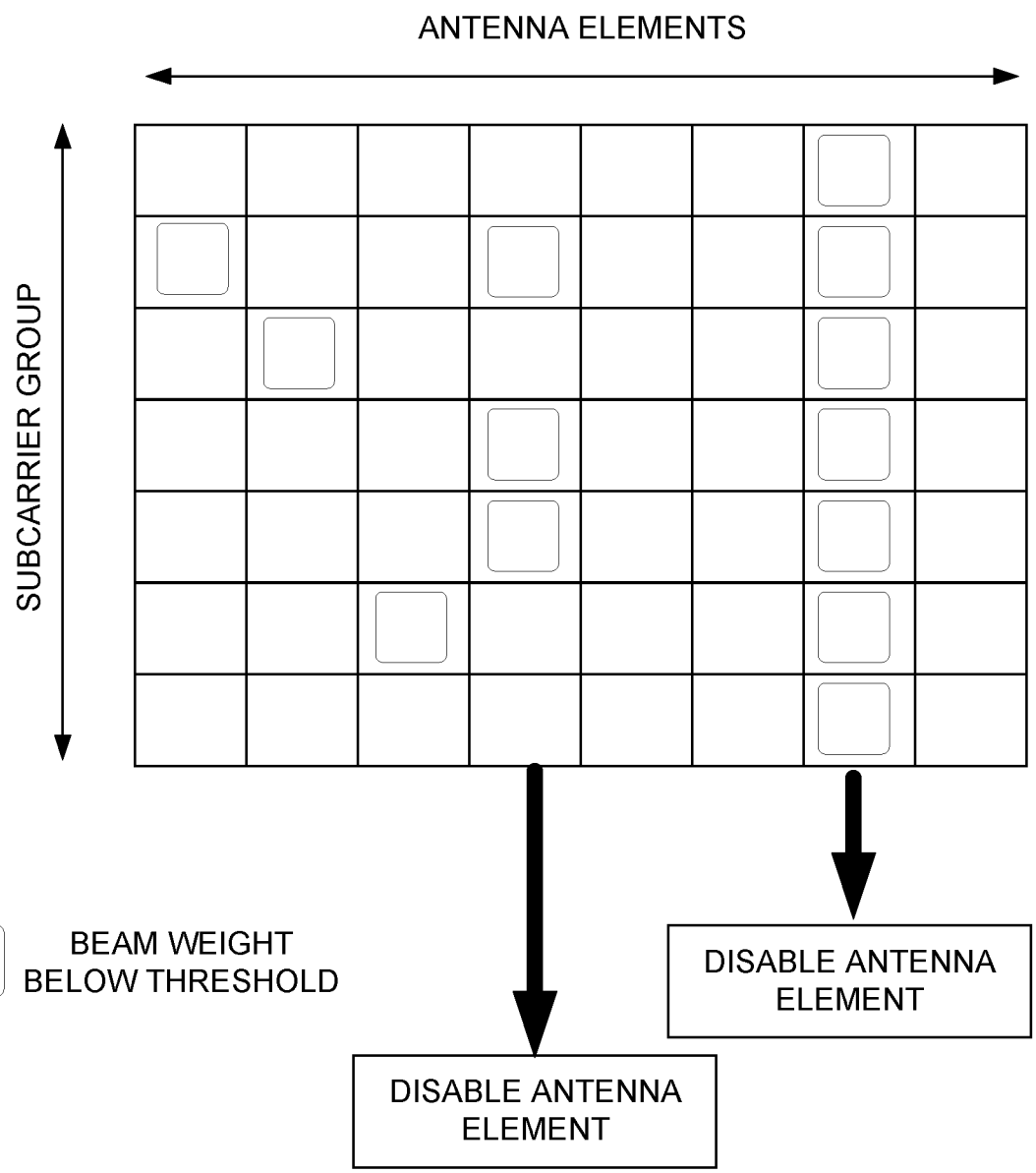
FIG. 7 shows another example for disabling one or more antenna element using weight thresholds according to another exemplary embodiment.

In one exemplary embodiment, the threshold condition comprises a weight threshold. In this embodiment, the processor circuit(s) 220 determine whether the amplitudes of the antenna weights of a subarray 230 satisfy the threshold condition by determining whether a predetermined number of the antenna weights for the subarray 230 each have an amplitude less than a weight threshold. When the predetermined number of antenna weights each have an amplitude less than the weight threshold, the processor circuit(s) 220 disable the corresponding power amplifier 214. FIG. 6 shows one example of this embodiment, where each subarray 230 comprises one antenna element 212, and where the predetermined number of antenna weights is all of the antenna weights for that antenna element 212. In the example of FIG. 6, only the power amplifier 214 for the $7^{th}$ antenna element 212 is disabled. It will be appreciated, however, that the solution presented herein does not require all of the antenna weights to be below the weight threshold before disabling the corresponding power amplifier 214. In some embodiments, the threshold condition is satisfied if some number of antenna weights less than all of the antenna weights have amplitudes less than the weight threshold. For example, FIG. 7 shows and exemplary implementation where the predetermined number of antenna weights is three. In this example, the power amplifiers 214 for the $4^{th}$ and $7^{th}$ antenna elements 212 are disabled. It will be appreciated that the same philosophy may be applied when the subarray 230 comprises multiple antenna elements 212. In that case, the predetermined number of antenna weights may be specified in terms of a predetermined number of antenna weights per subarray 230, or in terms of a predetermined number of antenna weights per antenna element 212 of the subarray 230. In the latter case, the processor circuit(s) 220 may further consider an additional threshold, e.g., an antenna element threshold to determine whether a sufficient number of antenna elements 212 in the subarray 230 have antenna weights that satisfy the weight threshold condition.

Figure 8:
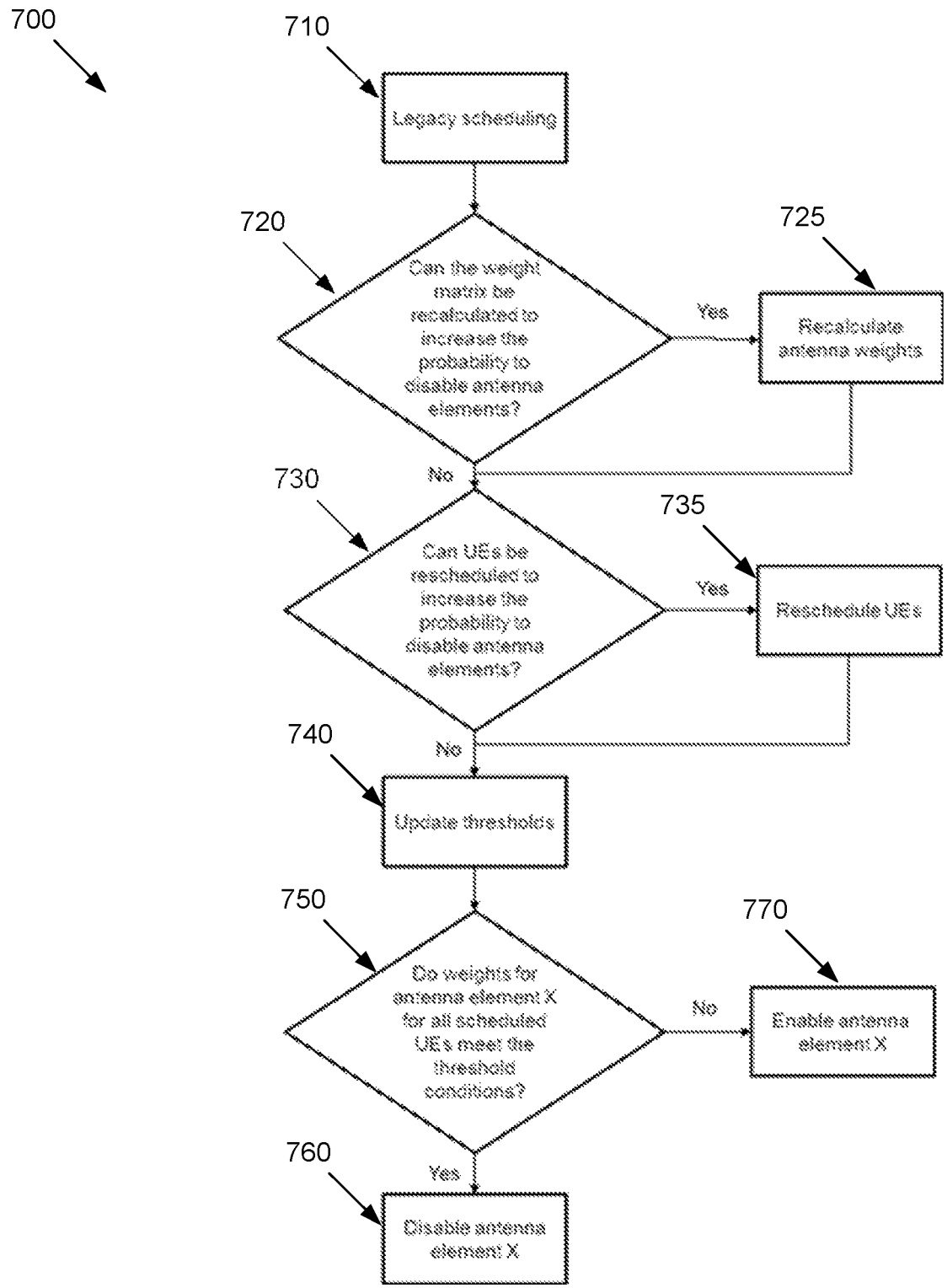
FIG. 8 shows a power consumption control method according to another exemplary embodiment.

FIG. 8 shows one exemplary method 700 using the weight threshold. According to this method 700, the solution disables the power amplifier of the antenna element(s) 212 for situations where the calculated beam weights in a beamforming system are below a defined dynamic weight threshold for all scheduled UEs in selected symbol(s). This gives a graceful degradation to the beam property while allowing for a substantial overall power reduction. Accordingly, the processor circuit(s) 220 perform legacy scheduling (block 710), and analyzes the antenna weights for all scheduled Sub-Carrier Groups (SCGs) in a Transmission Time Interval (TTI) to see if the antenna weights could be recalculated and/or shifted within the matrix to increase the likelihood of one or more antenna elements 212 being disabled (block 720). If yes, the matrix of antenna weights is recalculated (block 730) and the processor circuit(s) 220 proceed to block 730. If no the processor circuit(s) 220 analyze the scheduling to see if the receiving nodes 300 can be rescheduled to increase the likelihood of one or more antenna elements 212 being disabled (block 730). If yes, the processor circuit(s) 220 reschedule the receiving nodes 300 (block 735) and proceed to block 740. If no, the processor circuit(s) 220 update the weight threshold(s) (block 740). If the antenna weights (e.g., a predetermined number of the antenna weights) for a particular antenna element 212 satisfy a threshold condition, e.g., have amplitudes that are below the corresponding weight threshold (block 750), the processor circuit(s) 220 disable the power amplifier 214 for that antenna element 212 (block 760). Otherwise, the processor circuit(s) 220 enable the antenna element 212 (block 770), unless they are already enabled.

It will be appreciated that the predetermined number of antenna weights required to satisfy the threshold condition may differ for different antenna elements 212/subarray 230. It will further be appreciated that the predetermined number of antenna weights required to satisfy the threshold condition may be fixed, or may be dynamically determined responsive to one or more varying conditions of the network and/or transmitting node 200. For example, the processor circuit(s) 220 may dynamically determine the predetermined number of antenna weights responsive to feedback from the receiving node, responsive to the importance of the subarray 230 (or antenna element 212) to the desired shape/direction of the beam 240, and/or responsive to the temperature of the subarray 230 (or antenna element 212), e.g., such as provided by the temperature sensor(s) 216. Exemplary feedback from the receiving node includes, but is not limited to; Channel Quality Indicators (CQIs) and/or Precoding Control Indicators (PCIs) reported by the receiving node, the number of Hybrid Automatic Repeat Requests (HARQ) acknowledgement/non-acknowledgement (ACK/NACK) reports received from the receiving node, and the Layer 2 Protocol Data Unit (PDU) ACK/NACKs received. In this way, the transmitting node 200 can establish the predetermined number of antenna weights to maximize the power savings while also considering the effect of the power savings on the desired shape/direction of the beam 240, and thus while ensuring that the power savings solution does not overly degrade the desired beam produced by the transmitting node 200.

It will be appreciated that other threshold conditions may be used to implement the solution presented herein. For example, the threshold condition may comprise an average threshold, where the processor circuit(s) 220 determine whether the corresponding plurality of antenna weights satisfy the threshold condition by averaging the amplitudes of the corresponding plurality of antenna weights and determining whether the determined average is less than the average threshold. In another example, the threshold condition may comprise a sum threshold, where the processor circuit(s) 220 determine whether the corresponding plurality of antenna weights satisfy the threshold condition by summing the amplitudes of the corresponding plurality of antenna weights and determining whether the determined sum is less than the sum threshold. Like with the weight threshold(s), different sum/average thresholds may be used for different antenna elements/subarrays. Also like the weight threshold(s), the sum/average thresholds may be used per subarray 230 or per antenna element 212 of the subarray 230. It will be appreciated that other threshold conditions not explicitly disclosed herein that evaluate the impact of a particular antenna element 212 and/or subarray 230 on the desired shape/direction of the beam 240 and/or power consumption in view of the antenna weights may also be used to implement the solution presented herein.

In any event, the threshold condition applied by the processor circuit(s) 220 may be fixed or may be dynamically determined by the processor circuit(s) 220 responsive to one or more varying conditions of the network and/or transmitting node 200. For example, the processor circuit(s) 220 may determine the threshold condition (e.g., the weight threshold(s), the sum threshold(s), the average threshold(s)) responsive to feedback from the receiving node. As a result, the transmitting node 200 may modify the threshold condition to allow further power savings (if the feedback indicates, e.g., good beam performance) or to reduce the power savings to improve the beam performance (if the feedback indicates, e.g., poor beam performance). Alternatively or additionally, the processor circuit(s) 220 may determine the threshold condition responsive to a temperature of the corresponding subarray 230. As a result, the transmitting node 200 may modify the threshold condition to allow further power savings (if the temperature indicates, e.g., low or acceptable subarray temperature) or to reduce the power savings to improve the beam performance (if the temperature indicates, e.g., overheating antenna element(s)). Alternatively or additionally, the processor circuit(s) 220 may determine the threshold condition responsive to a channel type between the antenna array 210 and the receiving node. As a result, the transmitting node 200 may modify the threshold condition to allow further power savings (if the channel has, e.g., low congestion) or to reduce the power savings to improve the beam performance (if the channel is, e.g., congested).

In exemplary embodiments, the solution presented herein may make further adjustments to further optimize the tradeoff between power consumption and beam performance. For example, the processor circuit(s) 220 may identify one or more of the subarrays 230 as being critical to the desired shape direction of the beam 240. In this scenario, the processor circuit(s) 220 may set the threshold condition for the identified critical subarray(s) 230 such that the identified critical subarrays 230 are less likely to have a disabled power amplifier 214 than the remaining subarrays 230. Subarray(s) 230 critical to the desired shape/direction of the beam 240 include, for example, those subarray(s) 230 that, if disabled, may result in unsatisfactory signal-to-noise ratios at the receiving node and/or loss of connection with the receiving node. The processor circuit(s) 220 may determine which subarray(s) 230 are critical responsive to feedback from the receiving node, known properties of the beam 240, channel conditions, the position of the antenna element 212 in the antenna array 210, etc. For example, the antenna elements 212 in the center of the antenna array 210 are more critical to the overall shape/direction of the beam 240 than the elements 212 near or at the edge of the array 210. Alternatively or additionally, the processor circuit(s) 220 may compare the number of subarrays 230 having a disabled power amplifier 214 to a beam threshold. When the number of subarrays 230 having a disabled power amplifier 214 exceeds the beam threshold (indicating that too many subarrays 230 have been disabled), the processor circuit(s) 220 may adjust the threshold condition for at least one subarray 230 until the number of subarrays 230 having a disabled power amplifier 214 is Alternatively or additionally, the processor circuit(s) 220 may evaluate the remaining subarrays 230 having an enabled power amplifier 214 (after the weight/threshold condition evaluation) to determine if any of these subarrays 230 are overheating. The processor circuit(s) 220 may then further disable the power amplifiers 214 for any overheated subarrays 230. Alternatively or additionally, the processor circuit(s) 220 may re-enable one or more power amplifiers 214 responsive to feedback from the receiving node. In so doing, the processor circuit(s) 220 can adjust for any undesirable beam degradation (e.g., causing lower performance at the receiving node) caused by the disabled power amplifiers 214.

Figure 9:
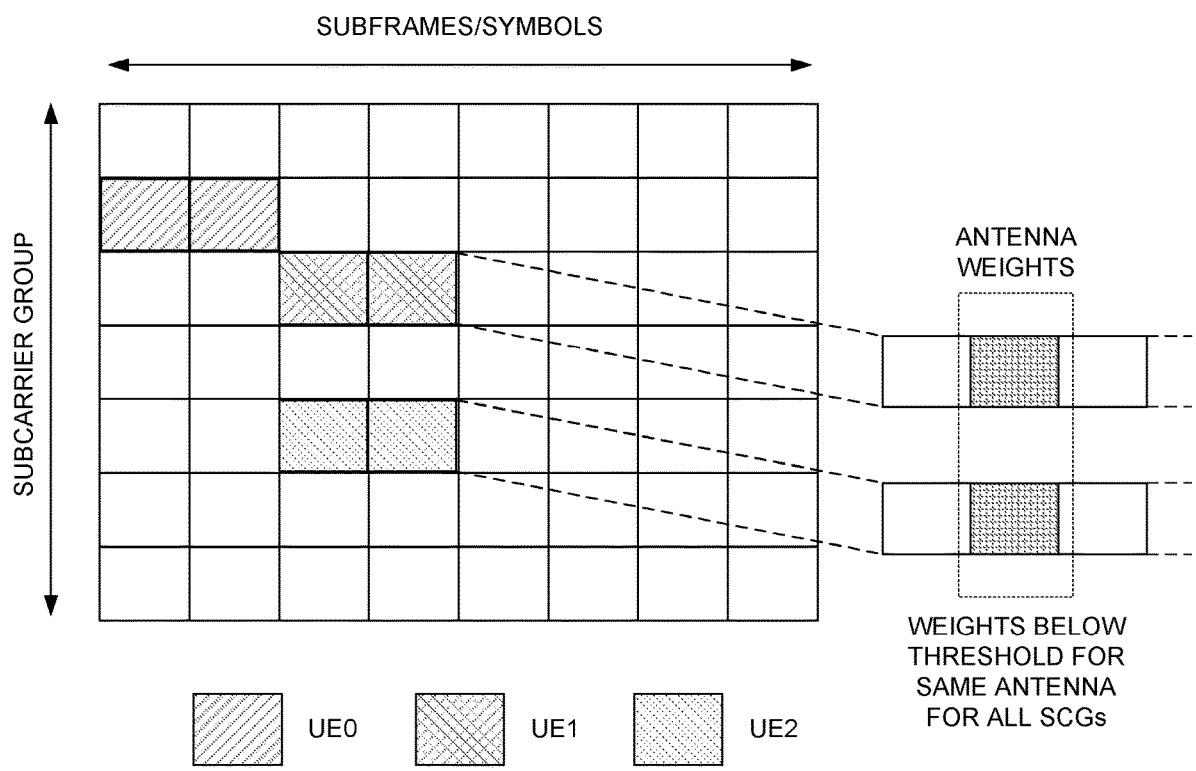
FIG. 9 shows exemplary placement of antenna weights applied to the antenna according to one exemplar embodiment.

In some embodiments, the transmitting node 200 may also configure the antenna weights to increase the likelihood that the power amplifier 214 of certain subarrays 230, and/or of an increased number of subarrays 230, is disabled. For example, the processor circuit(s) 220 may determine an antenna weight distribution across the antenna weights 214 to increase the number of subarrays 230 having antenna weights that satisfy the threshold condition and/or to increase the likelihood that certain subarrays 230 will satisfy the threshold condition, e.g., as shown in FIG. 9. Alternatively or additionally, the processor circuit(s) 220 may schedule communications to the receiving node so as to increase the number of subarrays 230 having antenna weights that satisfy the threshold condition and/or to increase the likelihood that certain subarrays 230 will satisfy the threshold condition. Alternatively or additionally, the processor circuit(s) 220 may recalculate the antenna weights to increase the likelihood that certain subarrays 230 will satisfy the threshold condition (e.g., option 2 in FIG. 8).

It will further be appreciated that while FIGS. 2 and 5 show the processor circuit(s) 220 being collocated with the antenna array 210, the solution presented herein does not require such colocation. In some embodiments, the transmitting node 200 may comprise a distributed node such that the antenna array 210 is remotely located from the processor circuit(s) 220.

It will be appreciated that the processor circuit(s) 220 may further adjust the threshold condition(s) responsive to the available power. For example, the processor circuit(s) may adjust the threshold condition(s) to increase the number of disabled power amplifiers if power is in short supply (e.g., low battery, strict electricity tariff, etc.) or may adjust the threshold condition(s) to decrease the number of disabled power amplifiers if power is more readily available.

The solution presented herein improves power savings over conventional approaches without overly sacrificing (or in some cases, not sacrificing at all) the quality of the generated beam 240. In particular, the solution enables the processor circuit(s) 220 to control the power consumption/beam quality tradeoff, and in some cases, to also reduce the overall heat generated by the antenna array 210.

Figure 10:
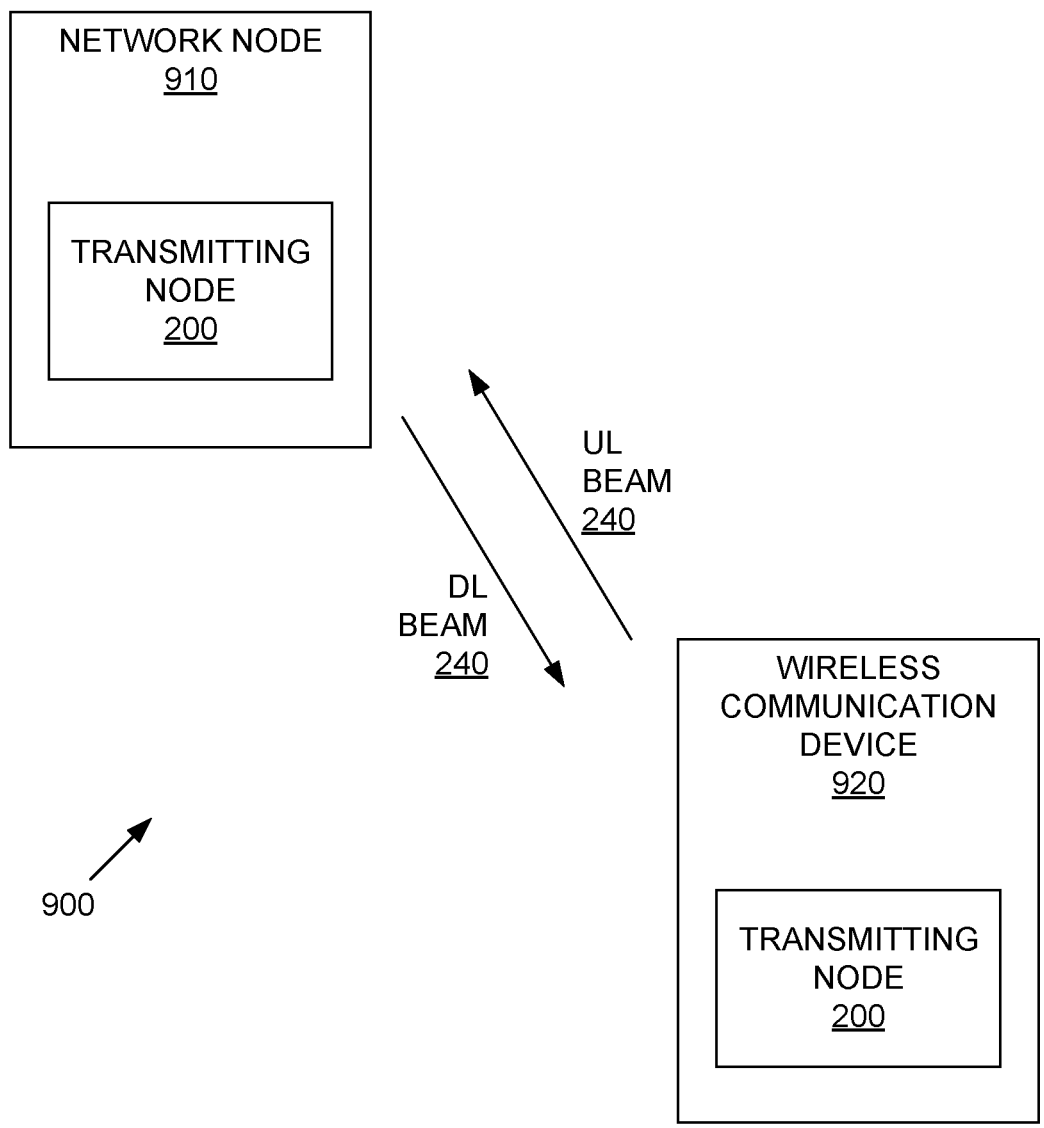
FIG. 10 shows an exemplary wireless network.

It will be appreciated that the transmitting node 200 disclosed herein may be part of any wireless transmitter in a wireless network. For example, as shown in FIG. 10, the transmitting node 200 may be comprised in a network node 910 of a wireless network 900 and the receiving node may be comprised in a wireless communication device 920 of the wireless network 900 such that the network node 910 transmits downlink (DL) communications to the wireless communication device 920 via the DL beam 240 created by antenna array 210. Alternatively, the transmitting node 200 may be comprised in the wireless communication device 920 and the receiving node may be comprised in the network node 910, such that the wireless communication device 920 transmits uplink (UL) communications to the network node 910 via the UL beam 240 created by antenna array 210.

The wireless network 900 may comprise and/or interface with any type of communication, telecommunication, data, cellular, and/or radio network or other similar type of system. In some embodiments, the wireless network 900 may be configured to operate according to specific standards or other types of predefined rules or procedures. Thus, particular embodiments of the wireless network 900 may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The network 900 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 910 comprises various components described in more detail herein. These components work together in order to provide network node and/or wireless device functionality, such as providing wireless connections in a wireless network 900. In different embodiments, the wireless network 900 may comprise any number of wired or wireless networks, network nodes, base stations, controllers, wireless devices, relay stations, and/or any other components or systems that may facilitate or participate in the communication of data and/or signals whether via wired or wireless connections.

As used herein, a network node 910 refers to equipment capable, configured, arranged and/or operable to communicate directly or indirectly with a wireless device 920 and/or with other network nodes or equipment in the wireless network to enable and/or provide wireless access to the wireless device 920 and/or to perform other functions (e.g., administration) in the wireless network 900. Examples of network nodes 910 include, but are not limited to, access points (APs) (e.g., radio access points), base stations (BSs) (e.g., radio base stations, Node Bs (NBs), evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node 910 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes 910 include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node 910 may be a virtual network node as described in more detail below. More generally, however, network nodes 910 may represent any suitable device (or group of devices) capable, configured, arranged, and/or operable to enable and/or provide a wireless device 920 with access to the wireless network 900 or to provide some service to a wireless device 920 that has accessed the wireless network 900.

As used herein, wireless device 920 refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device 920 may be configured to transmit and/or receive information without direct human interaction. For instance, a wireless device 920 may be designed to transmit information to a network on a predetermined schedule, when triggered by an internal or external event, or in response to requests from the network. Examples of a wireless device 920 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device 920 may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device 920 may represent a machine or other device that performs monitoring and/or measurements, and transmits the results of such monitoring and/or measurements to another wireless device 920 and/or a network node 910. The wireless device 920 may in this case be a machine-to-machine (M2M) device, which may in a 3GPP context be referred to as an MTC device. As one particular example, the wireless device 920 may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device 920 may represent a vehicle or other equipment that is capable of monitoring and/or reporting on its operational status or other functions associated with its operation. A wireless device 920 as described above may represent the endpoint of a wireless connection, in which case the device may be referred to as a wireless terminal. Furthermore, a wireless device 920 as described above may be mobile, in which case it may also be referred to as a mobile device or a mobile terminal.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures, e.g., FIG. 1. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of controlling power consumption of an antenna array in a transmitting node configured to communicate with a receiving node via a beam having a beam shape and a beam direction configured by the transmitting node, the antenna array comprising a plurality of subarrays, each subarray comprising one or more antenna elements, each antenna element comprising at least one antenna weight for each of a plurality of subcarrier frequencies, the method comprising:
   for each subarray:
      determining whether the corresponding plurality of antenna weights satisfy a threshold condition; and
      when the corresponding plurality of antenna weights satisfy the threshold condition, disabling a power amplifier for the subarray.

2. The method of claim 1, wherein the threshold condition comprises a weight threshold, and wherein determining whether the corresponding plurality of antenna weights satisfy the threshold condition comprises determining whether a predetermined number of the corresponding plurality of antenna weights have an amplitude less than the weight threshold.

3. The method of claim 2, wherein the predetermined number of the corresponding plurality of antenna weights may be different for different antenna elements.

4. The method of claim 2, further comprising varying the predetermined number of the corresponding plurality of antenna weights responsive to at least one of:
   feedback from the receiving node;
   the importance of the subarray to the beam; and
   a temperature of the subarray.

5. The method of claim 1, wherein the threshold condition comprises a sum threshold, and wherein determining whether the corresponding plurality of antenna weights satisfy the threshold condition comprises determining whether a sum of a plurality of amplitudes of the corresponding plurality of antenna weights is less than the sum threshold, and/or wherein the threshold condition comprises an average threshold, and wherein determining whether the corresponding plurality of antenna weights satisfy the threshold condition comprises determining whether an average of a plurality of amplitudes of the corresponding plurality of antenna weights is less than the average threshold.

6. The method of claim 1, further comprising:
   determining the threshold condition for at least one of the plurality of subarrays responsive to feedback from the receiving node, and/or
   determining the threshold condition for at least one of the plurality of subarrays responsive to a temperature of the corresponding subarray, and/or
   determining the threshold condition for at least one of the plurality of subarrays responsive to a type of a channel between the transmitting node and the receiving node.

7. The method of claim 1, further comprising:
   identifying one or more of the plurality of subarrays critical to a quality of the beam; and
   determining the threshold condition for the identified one or more subarrays by setting the threshold condition for the identified one or more subarrays such that the identified one or more subarrays are less likely to have a disabled power amplifier than the remaining subarrays, and/or
   wherein one or more of the plurality of subarrays have a different threshold condition relative to the remaining one or more of the plurality of subarrays, or
   wherein each of the plurality of subarrays has the same threshold condition.

8. The method of claim 1, further comprising, for each subarray having an enabled power amplifier:
   determining a temperature of the subarray; and
   disabling the power amplifier for the subarray when the temperature of the subarray exceeds a temperature threshold, and/or receiving feedback from the receiving node;
   re-enabling one or more of the disabled power amplifiers responsive to the received feedback, and/or
   determining an antenna weight distribution across the antenna elements to increase the number of subarrays having antenna weights that satisfy the threshold condition, and/or
   scheduling communications to the receiving node such that the number of subarrays having antenna weights that satisfy the threshold condition is increased.

9. The method of claim 1, further comprising:
   comparing the number of subarrays having a disabled power amplifier to a beam threshold; and
   when the number of subarrays having a disabled power amplifier exceeds the beam threshold, adjusting the threshold condition for at least one subarray to reduce the number of subarrays having a disabled power amplifier to be below the beam threshold.

10. The method of claim 1, wherein the transmitting node is part of a network node configured to transmit downlink communications to the receiving node via the beam, or wherein the transmitting node is part of a wireless communication device configured to transmit uplink communications to the receiving node via the beam.

11. The method of claim 1, wherein each subarray comprises two or more antenna elements, and wherein determining whether the corresponding plurality of antenna weights satisfy the threshold condition comprises determining whether the corresponding plurality of antenna weights in each antenna element in the subarray satisfy the threshold condition.

12. A transmitting node configured to communicate with a receiving node via a beam having a beam shape and a beam direction configured by the transmitting node, the transmitting node comprising:
an antenna array comprising:
a plurality of subarrays, each subarray comprising one or more antenna elements, each antenna element comprising at least one antenna weight for each of a plurality of subcarrier frequencies; and
a plurality of power amplifiers, each power amplifier operatively connected to a corresponding one of the plurality of subarrays;
one or more processor circuits configured to, for each subarray:
determine whether the corresponding plurality of antenna weights satisfy a threshold condition; and
when the corresponding plurality of antenna weights satisfy the threshold condition, disable the power amplifier operatively connected to the subarray.

13. The transmitting node of claim 12, wherein the threshold condition comprises a weight threshold, and wherein the one or more processor circuits determine whether the corresponding plurality of antenna weights satisfy the threshold condition by determining whether a predetermined number of the corresponding plurality of antenna weights have an amplitude less than the weight threshold.

14. The transmitting node of claim 13, wherein the predetermined number of the corresponding plurality of antenna weights may be different for different antenna elements.

15. The transmitting node of claim 13, wherein the one or more processor circuits are further configured to vary the predetermined number of the corresponding plurality of antenna weights responsive to at least one of:
feedback from the receiving node;
the importance of the subarray to the beam; and
a temperature of the subarray.

16. The transmitting node of claim 12, wherein the threshold condition comprises a sum threshold, and wherein the one or more processor circuits determine whether the corresponding plurality of antenna weights satisfy the threshold condition by determining whether a sum of a plurality of amplitudes of the corresponding plurality of antenna weights is less than the sum threshold, and/or wherein the threshold condition comprises an average threshold, and wherein the one or more processor circuits determine whether the corresponding plurality of antenna weights satisfy the threshold condition by determining whether an average of a plurality of amplitudes of the corresponding plurality of antenna weights is less than the average threshold.

17. The transmitting node of claim 12, the one or more processor circuits are further configured to:
determine the threshold condition for at least one of the plurality of subarrays responsive to feedback from the receiving node, and/or
detect a temperature of one or more of the plurality of subarrays, wherein the one or more processor circuits are further configured to determine the threshold condition for at least one of the plurality of subarrays responsive to the detected temperature of the corresponding subarray, and/or
determine the threshold condition for at least one of the plurality of subarrays responsive to a type of a channel between the transmitting node and the receiving node.

18. The transmitting node of claim 12, wherein the one or more processor circuits are further configured to:
identify one or more of the plurality of subarrays critical to a quality of the beam; and
determine the threshold condition for the identified one or more subarrays by setting the threshold condition for the identified one or more subarrays such that the identified one or more subarrays are less likely to have a disabled power amplifier than the remaining subarrays, and/or
wherein each of the plurality of subarrays has the same threshold condition, or
wherein at least some of the plurality of subarrays have a different threshold condition.

19. The transmitting node of claim 12, further comprising at least one temperature sensor configured to detect a temperature of one or more of the plurality of subarrays, wherein the one or more processor circuits are further configured to, for each subarray having an enabled power amplifier disable the corresponding power amplifier when the detected temperature of the corresponding subarray exceeds a temperature threshold, and/or
wherein the one or more processor circuits are further configured to:
receive feedback from the receiving node;
re-enable one or more of the disabled power amplifiers responsive to the received feedback, receive feedback from the receiving node;
re-enable one or more of the disabled power amplifiers responsive to the received feedback, and/or
determine an antenna weight distribution across the antenna elements to increase the number of subarrays having antenna weights that satisfy the threshold condition, and/or schedule communications to the receiving node such that the number of subarrays having antenna weights that satisfy the threshold condition is increased.

20. The transmitting node of claim 12, wherein the one or more processor circuits are further configured to:
compare the number of subarrays having a disabled power amplifier to a beam threshold; and
when the number of subarrays having a disabled power amplifier exceeds the beam threshold, adjust the threshold condition for at least one subarray to reduce the number of subarrays having a disabled power amplifier to be below the beam threshold.

* * * * *